(12) United States Patent
Taguchi et al.

(10) Patent No.: US 7,372,798 B2
(45) Date of Patent: May 13, 2008

(54) OPTICAL ELEMENT AND OPTICAL PICKUP DEVICE

(75) Inventors: Tomokazu Taguchi, Sakai (JP); Miyuki Teramoto, Osakasayama (JP); Katsuya Fukatani, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 592 days.

(21) Appl. No.: 11/099,048

(22) Filed: Apr. 5, 2005

(65) Prior Publication Data

US 2005/0226125 A1    Oct. 13, 2005

(30) Foreign Application Priority Data

Apr. 8, 2004 (JP) .............................. 2004-114636

(51) Int. Cl.
*G11B 7/00* (2006.01)
(52) U.S. Cl. .................... 369/112.28; 369/112.01; 359/833
(58) Field of Classification Search ........... 369/112.01, 369/112.21, 112.28, 112.29; 359/833
See application file for complete search history.

(56) References Cited

U.S. PATENT DOCUMENTS

| | | | |
|---|---|---|---|
| 5,973,835 A * | 10/1999 | Tsou et al. ................. | 359/495 |
| 6,005,835 A | 12/1999 | Tsuji et al. | |
| 6,870,694 B2 * | 3/2005 | Nishi et al. ................. | 359/831 |
| 2005/0122883 A1 * | 6/2005 | Kimura .................. | 369/112.05 |

FOREIGN PATENT DOCUMENTS

| JP | 7301703 | 11/1995 |
|---|---|---|
| JP | 2002 365411 | 12/2002 |
| JP | 2003 222707 | 8/2003 |

* cited by examiner

*Primary Examiner*—Thang V. Tran
(74) *Attorney, Agent, or Firm*—Brinks Hofer Gilson & Lione

(57) ABSTRACT

An optical element has a dichroic film held between transparent materials which transmits one of first light in a wavelength range of 390 to 425 nm and second light in a wavelength range of 630 to 820 nm and reflects the other light, and a first, a second, a third and a fourth surfaces. In the optical element, a first anti-reflection film for preventing reflection of the first light is formed on the first surface, a second anti-reflection film for preventing reflection of the second light is formed on the second surface, and a third anti-reflection film for preventing the reflection of the first and the second light is formed on the third surface from which the incident light of the first surface and the second surface is emitted. In the third anti-reflection film, reflectance of the second light is larger than that of the first light.

16 Claims, 5 Drawing Sheets

OPTICAL ELEMENT AND OPTICAL PICKUP DEVICE

This application is based on the application No. 2004-114636 filed in Japan Apr. 8, 2004, the entire content of which is hereby incorporated by reference.

BACKGROUND OF THE INVENTION

1. Field of the Invention

The present invention relates to an optical element where light with a wide wavelength range including blue light to near infrared ray enters. Further, the invention relates to the optical element which multiplexes blue light, red light and near infrared ray whose incident directions are different from one another, and an optical pickup device using it.

2. Description of the Related Art

Optical disc devices which reproduce or record information from/into optical discs such as CD or DVD read and write signals using light with wavelengths different according to media. U.S. Pat. No. 6,005,835 discloses a constitution in which one optical pickup device reads various types of optical discs.

This optical pickup device has a plurality of light sources which emit light beams with different wavelengths. As the light beams emitted from the light sources, red light of 650 nm band (630 to 690 nm) and near infrared ray of 780 nm band (740 to 820 nm) are used to read DVD-ROM, CD-ROM, and the like. When the light source according to an optical disc is driven and light with predetermined wavelength is emitted to the optical disc, the light reflected by the optical disc is captured by a light receiving element. As a result, even if different types of optical discs are used, signals according to wavelengths for used optical discs can be read.

Emitted light from the light sources enters a prism from directions perpendicular to one another. A dichroic film which reflects or transmits the light according to wavelengths is provided to the prism, and the incident light is emitted to one direction by the dichroic film. As a result, even if different types of light sources are driven, the light beams are multiplexed so as to be capable of being emitted to the optical discs.

In recent years, since the optical discs as recording media have high density, in addition to the red light and the near infrared ray, blue light of 410 nm band (390 nm to 425 nm) is used as emitted light from the light sources. As a result, Blu-ray Discs, HD DVD and the like can be read. At this time, an anti-reflection film which prevents blue light from being reflected is provided to the incident surface for the blue light in the prism which multiplexes the light beams. An anti-reflection film which prevents red light and near infrared ray from being reflected is provided to an incident surface for the red light and the near infrared ray whose wavelengths are longer than that of the blue light. Further, an anti-reflection film which prevents the blue light, the red light and the near infrared ray from being reflected is provided to an emission surface of the prism.

FIG. 8 illustrates reflection characteristics of the conventional anti-reflection film which prevents the reflection of the blue light, the red light and the near infrared ray provided to the emission surface of the prism. Reflectance (unit: %) is read along an axis of ordinates, and wavelength (unit: nm) is read along an axis of abscissas. The anti-reflection film is formed by laminating optical thin films, and its constitution is shown in Table 1. In the drawing, T1 designates a wavelength range of the blue light, and T2 designates a wavelength range of the red light and the near infrared ray. In Table 1, H4 is a product made by Merck KGaA, and a mixture of $TiO_2$ and $La_2O_3$.

TABLE 1

| Layer | Material | Refractive index | Film thickness nm |
|---|---|---|---|
| 8 | $MgF_2$ | 1.385 | 109.66 |
| 7 | H4 | 2.15 | 30.01 |
| 6 | $MgF_2$ | 1.385 | 25.81 |
| 5 | H4 | 2.15 | 57.44 |
| 4 | $MgF_2$ | 1.385 | 23.94 |
| 3 | H4 | 2.15 | 29.11 |
| 2 | $MgF_2$ | 1.385 | 10.00 |
| 1 | $Al_2O_3$ | 1.62 | 83.13 |
| Substrate | Glass | 1.52 | |

H4 is a mixture of $TiO_2$ and $La_2O_3$

In the anti-reflection film shown in Table 1 and FIG. 8, the reflectance of the blue light, the red light and the near infrared ray is about 0.4%. The light source which emits the blue light has, however, small output, and when the reflectance of the anti-reflection film is about 0.4%, a light amount which is necessary for reading an optical disc cannot be occasionally secured due to loss. For this reason, there is a problem that reading error of an optical disc occurs. Moreover, when the reflectance of the blue light, the red light and the near infrared ray is reduced, there is another problem that a number of laminations of optical thin films increases, and thus the costs of the prism and the optical pickup device increase.

SUMMARY OF THE INVENTION

It is an object of the present invention to provide an optical element and an optical pickup device which can reduce loss of light inexpensively.

To achieve the above object, according to first aspect of the present invention, an optical element has a dichroic film held between transparent materials which transmits one of first light included in a wavelength range of 390 to 425 nm and second light included in a wavelength range of 630 to 820 nm and reflects the other light, and a first, a second, a third and a fourth surfaces which tilt with respect to the dichroic film and where adjacent surfaces are perpendicular to each other. In the optical element having a rectangular shape viewed from plane, a first anti-reflection film for preventing reflection of the first light is formed on the first surface, a second anti-reflection film for preventing reflection of the second light is formed on the second surface which is perpendicular to the first surface, and a third anti-reflection film for preventing the reflection of the first and the second light is formed on the third surface from which the incident light of the first surface and the second surface is emitted. In the third anti-reflection film, reflectance of the second light is larger than that of the first light.

According to second aspect of the present invention, the optical element for used in optical pickup device has a transmitting surface which transmits a first light in a wavelength range of 390 to 425 nm and a second light in a wavelength range of 630 to 820 nm. The transmitting surface has an anti-reflection film for preventing reflection of the transmitting light, and in the anti-reflection film, the reflectance of the first light is not more than 0.3% and the reflectance of the second light is not less than 0.5% to not more than 4%. The transmitted light through the transmitting surface travels to an optical disk.

According to third aspect of the present invention, the optical pickup device has a first light source emitting a first light included in a wavelength range of 390 to 425 nm, a second light source emitting a second light included in a wavelength range of 630 to 820 nm and an optical element synthesizing an optical path of the first light and an optical path of the second light. The optical element includes a dichroic film, a first, a second, a third and a fourth surfaces that tilt with respect to the dichroic film and where adjacent surfaces are perpendicular to each other. The dichroic film is held between transparent materials. The dichroic film transmits one of first light and second light and reflects the other light. The optical element further includes a first anti-reflection film for preventing reflection of the first light formed on the first surface where the first light enters, a second anti-reflection film for preventing reflection of the second light formed on the second surface where the second light enters, the second surface being perpendicular to the first surface, and a third anti-reflection film for preventing the reflection of the first and the second light formed on the third surface from which the incident light of the first surface and the second surface is emitted. The third anti-reflection film has a characteristic such that a reflectance of the first light is lower than a reflectance of the second light. And each of the first and second lights transmitted through the third surface travels to an optical disc.

According to fourth aspect of the present invention, the optical pickup device has a first light source emitting a first light included in a wavelength range of 390 to 425 nm, a light source unit selectively emitting a second light included in a wavelength range of 630 to 690 nm and a third light included in a wavelength range of 740 to 820 nm, and an optical element synthesizing an optical path of the first light and optical paths of the second and third lights. The optical element includes a dichroic film, a first, a second, a third and a fourth surfaces that tilt with respect to the dichroic film and where adjacent surfaces are perpendicular to each other. The dichroic film is held between transparent materials. The dichroic film transmits one of first light and the light from the light source unit and reflects the other light. The optical element further includes a first anti-reflection film for preventing reflection of the first light formed on the first surface where the first light enters, a second anti-reflection film for preventing reflection of the second and third lights formed on the second surface where the second and third lights enter, the second surface being perpendicular to the first surface; and a third anti-reflection film for preventing the reflection of the first, second and third lights formed on the third surface from which the incident light of the first surface and the second surface is emitted. The third anti-reflection film has a characteristic such that a reflectance of the first light is lower than a reflectance of the second and third lights. And each of the first, second and third lights transmitted through the third surface travels to an optical disc.

BRIEF DESCRIPTION OF THE DRAWINGS

These and other objects, advantages and features of the invention will become apparent from the following description thereof taken in conjunction with the preferred embodiments with the reference to the accompanying drawings in which.

DETAILED DESCRIPTION OF THE PREFERRED EMBODIMENTS

Figure 1:
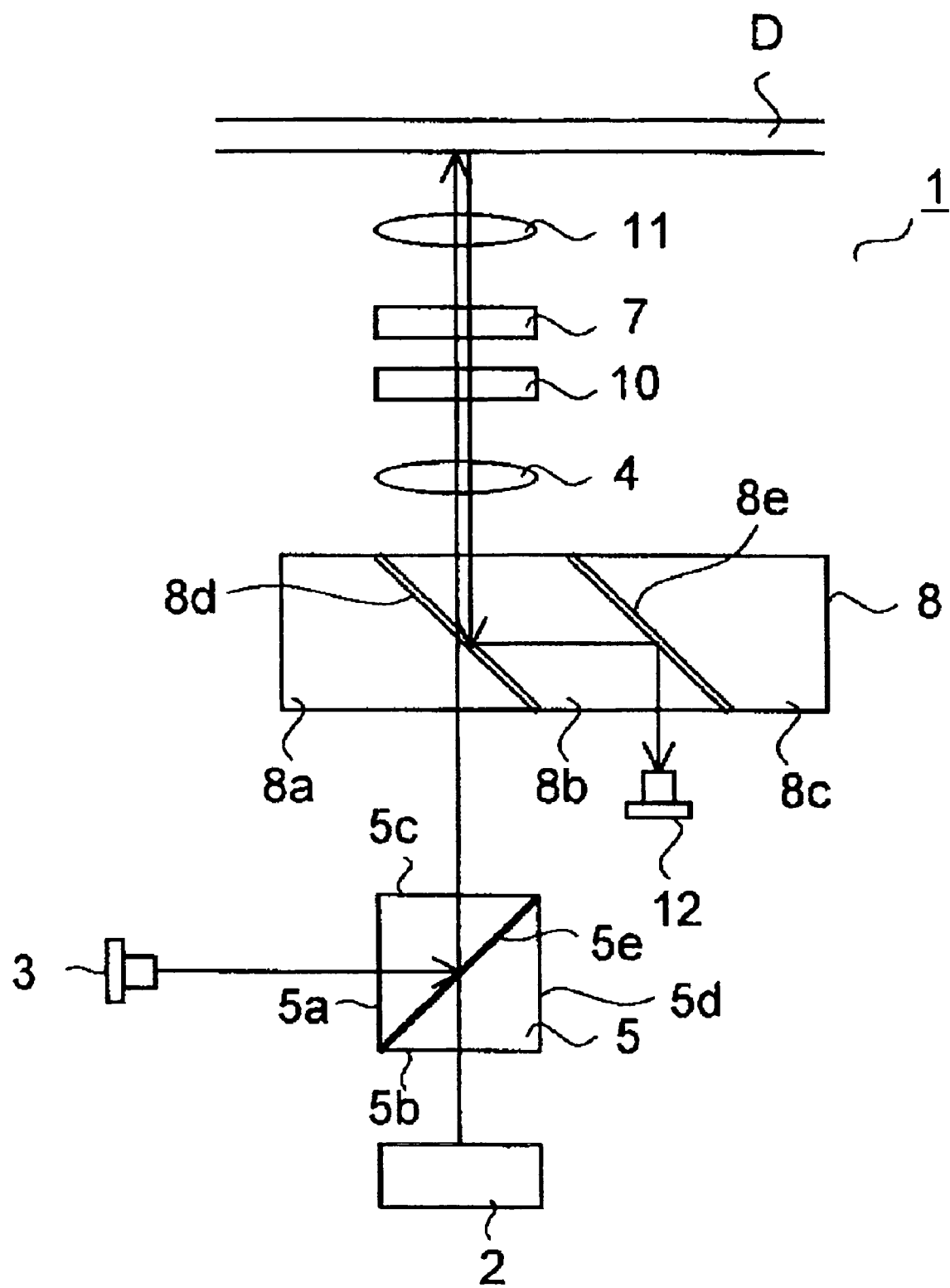
FIG. 1 is a block diagram illustrating a constitution of an optical pickup device according to a first embodiment of the present invention.

Embodiments of the present invention are explained below with reference to the drawings. FIG. 1 is a block diagram illustrating an optical pickup device according to a first embodiment. The optical pickup device 1 has a light source unit 2 which selectively emits red light with wavelength range of 650 nm band (630 nm to 690 nm) and near infrared ray with wavelength of 780 nm band (740 nm to 820 nm) according to an optical disc D. The light source unit 2 is composed of a plurality of light sources and an optical element which uniforms emitting directions. Information can be read from DVD-ROM by the red light, and information can be read from CD-ROM by the near infrared ray. The light source unit 2 may be composed of one light source so as to emit light with single wavelength range.

Further, the optical pickup device 1 has a light source 3 which emits blue light whose wavelength range is 410 nm band (390 to 425 nm). Information can be read from a Blu-ray Disc and HD DVD by the blue light. A prism 5 is arranged on optical paths of the emitted light from the light source unit 2 and the light source 3. The prism 5 is formed into a rectangular shape viewed from a plane so that a dichroic film 5e which tilts with respect to the optical paths is held between two rectangular prisms made of transparent material. The tilted surfaces of the rectangular prisms are joined to each other. As a result, the prism 5 has first to fourth surfaces 5a to 5d which are opposed slantingly with respect to the dichroic film 5e.

The dichroic film 5e reflects blue light and transmits red light and near infrared ray whose wavelength is longer than that of the blue light. The emitted light from the light source unit 2, therefore, enters the second surface 5b of the prism 5 and transmits through the dichroic film 5e so as to be emitted from the third surface 5c opposed to the second surface 5b to a direction of the optical disc D. Further, the emitted light from the light source 3 enters the first surface 5a of the prism 5 so as to be reflected from the dichroic film 5e and is emitted from the third surface 5c to the direction of the optical disc D.

Figure 2:
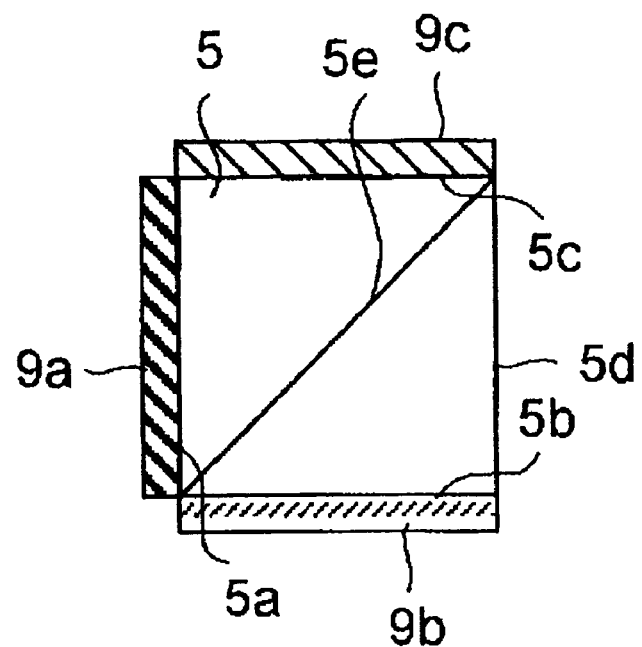
FIG. 2 is a plan view illustrating a prism of the optical pickup device according to the first embodiment of the present invention.
Figure 5:
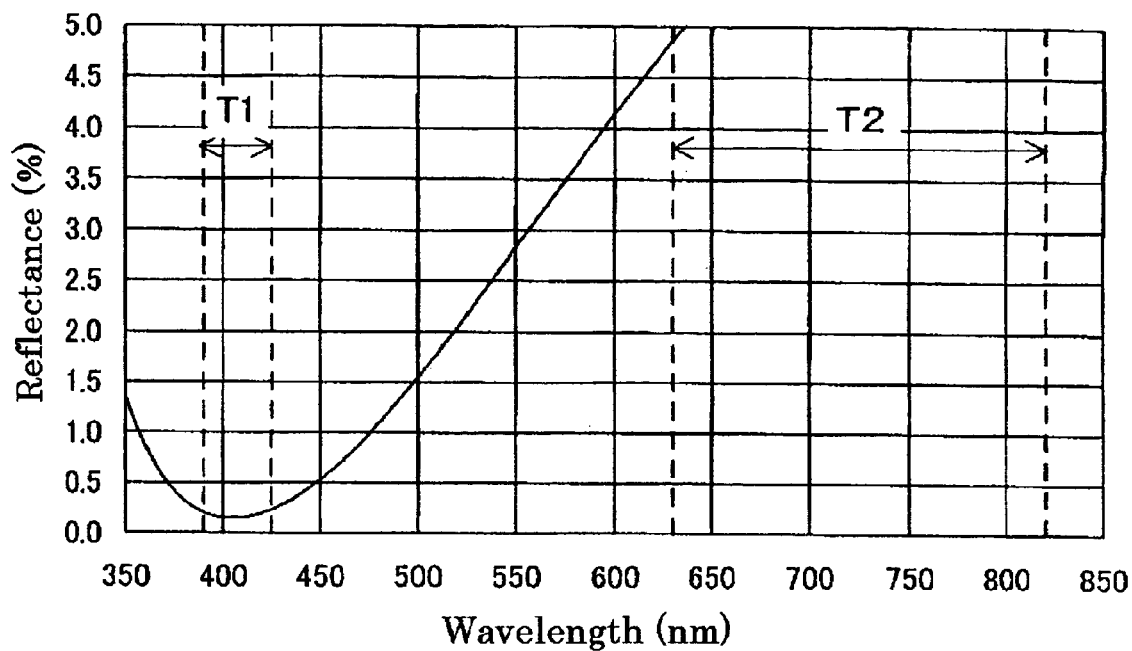
FIG. 5 is a diagram illustrating reflection characteristics of a first anti-reflection film of the prism in the optical pickup device according to the first embodiment of the present invention.

FIG. 2 is a plan view illustrating the prism 5 in detail. The first surface 5a of the prism 5 is provided with an anti-reflection film 9a (first anti-reflection film) which prevents the blue light from being reflected. FIG. 5 illustrates reflection characteristics of the anti-reflection film 9a. Reflectance (unit: %) is read along an axis of ordinates, and wavelength (unit: nm) is read along an axis of abscissas. Table 2 shows a constitution of the anti-reflection film 9a. T1, T2 and H4 in the drawing and the table are similar to the above ones. According to FIG. 5 and Table 2, the anti-reflection film 9a is constituted by laminating three optical thin films, and the reflectance of the blue light is not more than 0.3%.

TABLE 2

| Layer | Material | Refractive index | Film thickness nm |
|---|---|---|---|
| 3 | $MgF_2$ | 1.385 | 84.59 |
| 2 | H4 | 2.15 | 20.83 |
| 1 | $Al_2O_3$ | 1.62 | 79.02 |
| Substrate | Glass | 1.52 | |

H4 is a mixture of $TiO_2$ and $La_2O_3$

Figure 6:
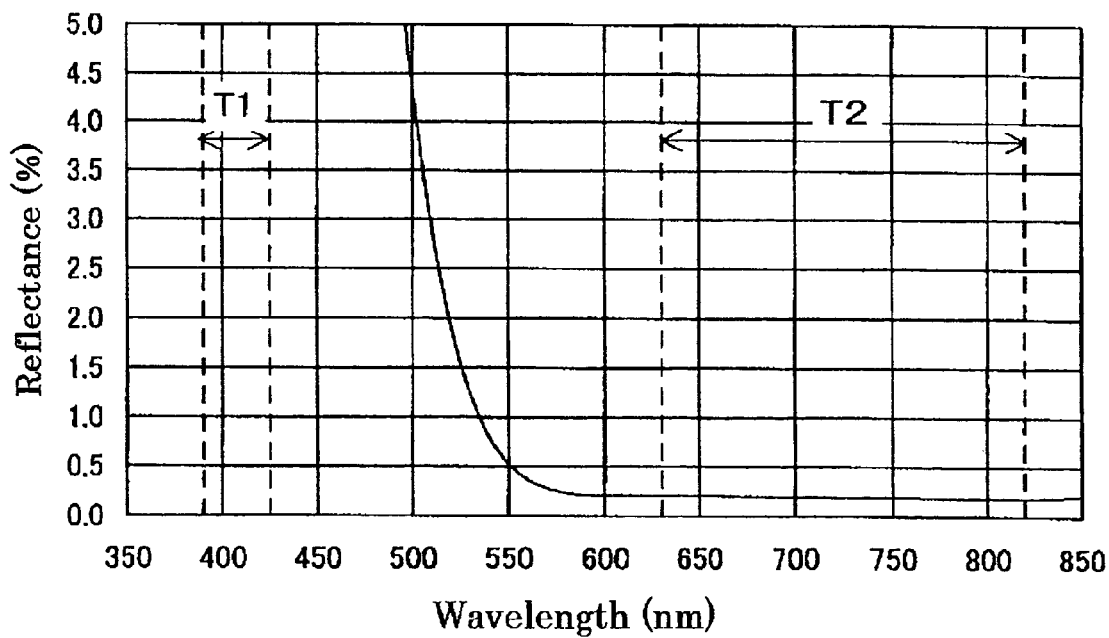
FIG. 6 is a diagram illustrating reflection characteristics of a second anti-reflection film of the prism in the optical pickup device according to the first and the second embodiments of the present invention.

The second surface 5b of the prism 5 is provided with an anti-reflection film 9b (second anti-reflection film) which prevents reflection of the red light and the near infrared ray. FIG. 6 illustrates reflection characteristics of the anti-reflection film 9b. Reflectance (unit: %) is read along an axis of ordinates, and wavelength (unit: nm) is read along an axis of abscissas. Table 3 shows a constitution of the anti-reflection film 9b. T1, T2 and H4 in the drawing and the table are similar to the above ones. According to FIG. 6 and Table 3, the anti-reflection film 9b is constituted by laminating six optical thin films, and the reflectance of the red light and the near infrared ray is not more than 0.3%.

TABLE 3

| Layer | Material | Refractive index | Film thickness nm |
|---|---|---|---|
| 6 | $MgF_2$ | 1.385 | 149.26 |
| 5 | H4 | 2.15 | 42.80 |
| 4 | $MgF_2$ | 1.385 | 46.00 |
| 3 | H4 | 2.15 | 40.60 |
| 2 | $MgF_2$ | 1.385 | 10.00 |
| 1 | $Al_2O_3$ | 1.62 | 117.37 |
| Substrate | Glass | 1.52 | |

H4 is a mixture of $TiO_2$ and $La_2O_3$

Figure 7:
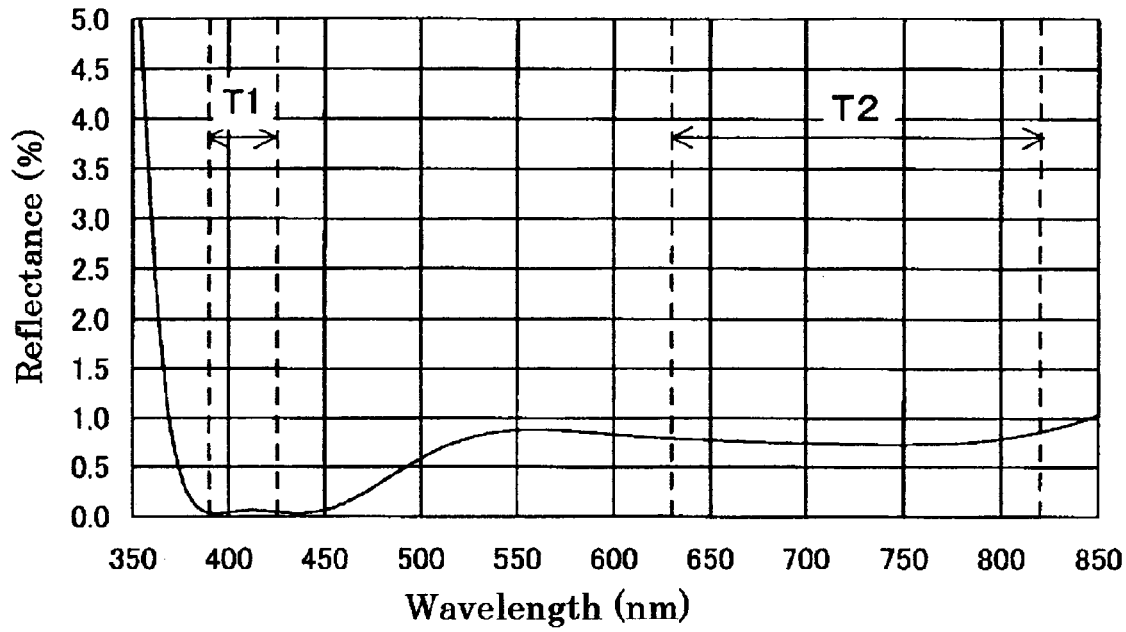
FIG. 7 is a diagram illustrating reflection characteristics of a third anti-reflection film of the prism in the optical pickup device according to the first to the third embodiments of the present invention.
Figure 8:
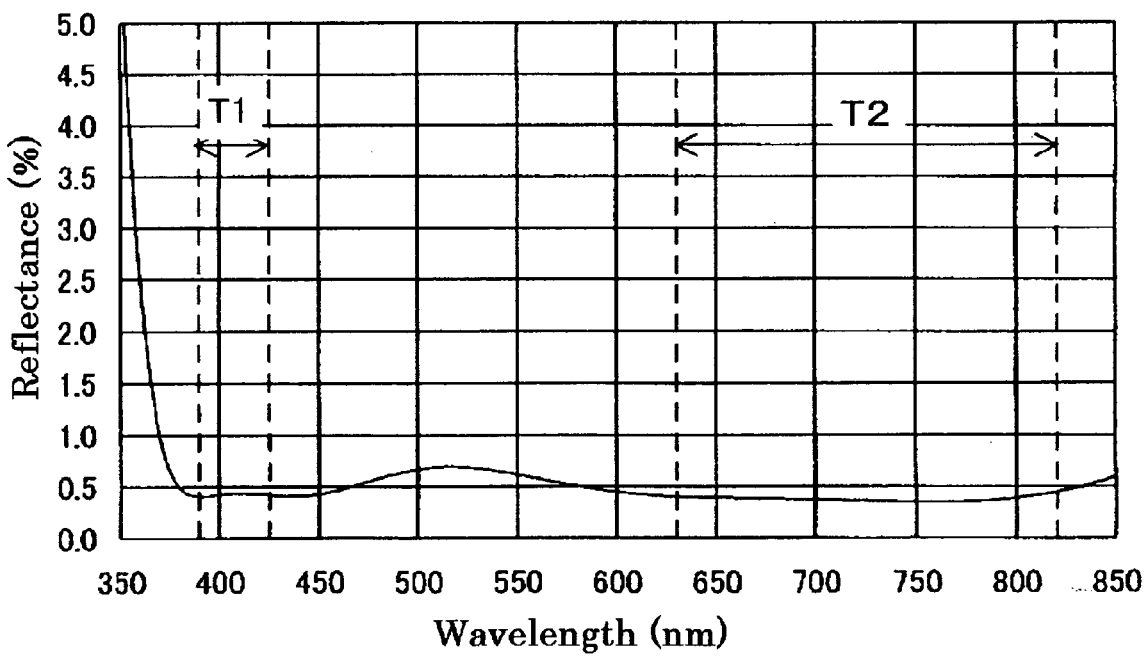
FIG. 8 is a diagram illustrating reflection characteristics of an anti-reflection film of the prism in a conventional optical pickup device.

The third surface 5c of the prism 5 is provided with an anti-reflection film 9c (third anti-reflection film) which prevents the blue light, the red light and the near infrared ray from being reflected. FIG. 7 illustrates reflection characteristics of the anti-reflection film 9c. Reflectance (unit: %) is read along an axis of ordinates, and wavelength (unit: nm) is read along an axis of abscissas. Table 4 shows a constitution of the anti-reflection film 9c. T1, T2 and H4 in the drawing and the table are similar to the above ones. According to FIG. 7 and Table 4, the anti-reflection film 9c is constituted by laminating eight optical thin films, and the reflectance of the blue light is not more than 0.1%. Further, the reflectance of the red light and the near infrared ray is not more than 1%.

TABLE 4

| Layer | Material | Refractive index | Film thickness nm |
|---|---|---|---|
| 8 | $MgF_2$ | 1.385 | 100.63 |
| 7 | H4 | 2.15 | 32.91 |

TABLE 4-continued

| Layer | Material | Refractive index | Film thickness nm |
|---|---|---|---|
| 6 | $MgF_2$ | 1.385 | 32.91 |
| 5 | H4 | 2.15 | 24.38 |
| 4 | $MgF_2$ | 1.385 | 21.68 |
| 3 | H4 | 2.15 | 30.57 |
| 2 | $MgF_2$ | 1.385 | 10.00 |
| 1 | $Al_2O_3$ | 1.62 | 88.63 |
| Substrate | Glass | 1.52 | |

H4 is a mixture of $TiO_2$ and $La_2O_3$

As a result, as to the light which enters the first and the second surfaces 5a and 5b and the light which is emitted from the third surface 5c, their loss due to the reflection can be reduced.

In FIG. 1, a PBS prism 8, a collimating lens 4, a λ/4 plate 10, a diffraction element 7 and a condensing lens 11 are arranged between the prism 5 and the optical disc D. The PBS prism 8 is formed by laminating light transmitting substrates 8a, 8b and 8c having a tilt surface tilted with respect to the optical paths. A PBS film 8d which transmits P polarized light and reflects S polarized light is provided to an interface between the substrates 8a and 8b. A reflection film 8e which reflects incident light is provided to an interface between the substrates 8b and 8c.

The collimating lens 4 converts the emitted light from the light source 2 into collimated light. The λ/4 plate 10 shifts a phase of light by λ/4. The emitted light from the light source unit 2 and the light source 3 enters the optical disc D and is reflected thereby, the emitted light passes through the λ/4 plate 10, so that the phase is shifted by λ/2 and the P polarized light is converted into S polarized light.

The diffraction element 7 is composed of a hologram or the like, and changes a condensing position of the condensing lens 11 according to wavelengths. The condensing lens 11 condenses the blue light, the red light and the near infrared ray onto the optical disc D. A light receiving element 12 composed of a photodiode or the like is provided on the reflection film 8e of the PBS prism 8 in a reflecting direction.

In the optical pickup device 1 having the above constitution, the P polarized light of the red light or the near infrared ray emitted from the light source unit 2 transmits through the dichroic film 5e and is led to the PBS prism 8. The P polarized light of the blue light emitted from the light source 3 is reflected from the dichroic film 5e and is led to the PBS prism 8. The incident light of the PBS prism 8 transmits through the PBS film 8d, and is converted into collimated light by the collimating lens 4. The collimated light passes through the λ/4 plate 10 and the diffraction element 7 so as to be condensed onto the recording surface of the optical disc D by the condensing lens 11. At this time, the condensing positions of the light with different wavelengths are changed by the diffraction element 7 according to types of the optical disc D.

The light reflected from the optical disc D transmits through the diffraction element 7, the λ/4 plate 10 and the collimating lens 4 so as to enter the PBS prism 8. At this time, since the incident light transmits through the λ/4 plate 10 twice, it is converted into the S polarized light. In the PBS prism 8, the S polarized light is reflected by the PBS film 8d and by the reflection film 8e so as to be received by the light receiving element 12. As a result, even if the type of the optical disc D varies, the signal according to wavelengths is captured and read by the light receiving element 12.

According to the embodiment, in the anti-reflection film 9c provided to the third surface 5c of the prism 5, the reflectance of the red light and the near infrared ray is larger than the reflectance of the blue light. The loss of the light emitted from the light source 3 for the blue light whose output cannot be large is reduced, and a reading error of the optical disc D can be reduced. When the reflectance of the blue light is set to be not more than 0.3%, the reading error of the optical disc D can be prevented.

The light source unit 2 which emits the red light and the near infrared ray whose wavelength is longer than that of the blue light can be easily set so that its output is heightened. For this reason, even if the reflectance of the anti-reflection film 9c is large, the output is heightened so that the reading error of the optical disc D can be prevented. As a result, a number of laminations of the optical thin films is reduced, so that the cost of the prism 5 and the optical pickup device 1 can be reduced. When the reflectance of the red light and the near infrared ray is not more than 4%, the output of the light source unit 2 is heightened, so that the reading error of the optical disc D can be prevented. Further, when the reflectance of the red light and the near infrared ray is not less than 0.5%, a number of laminations of the optical thin films can be reduced.

In the embodiment, although the prism 5 is formed into a square shape viewed from plane, it may be formed into a rectangular shape viewed from plane in which the distance between the first surface 5a and the fourth surface 5d is lengthened.

The optical pickup device according to a second embodiment is explained below with reference to the drawing. For convenience of the explanation, the same parts as those in the first embodiment shown in FIGS. 1 and 2 are designated by the same reference numerals. In the second embodiment, the constitution of the prism 5 is different from that in the first embodiment, and the other parts are the same as those in the first embodiment.

Figure 3:
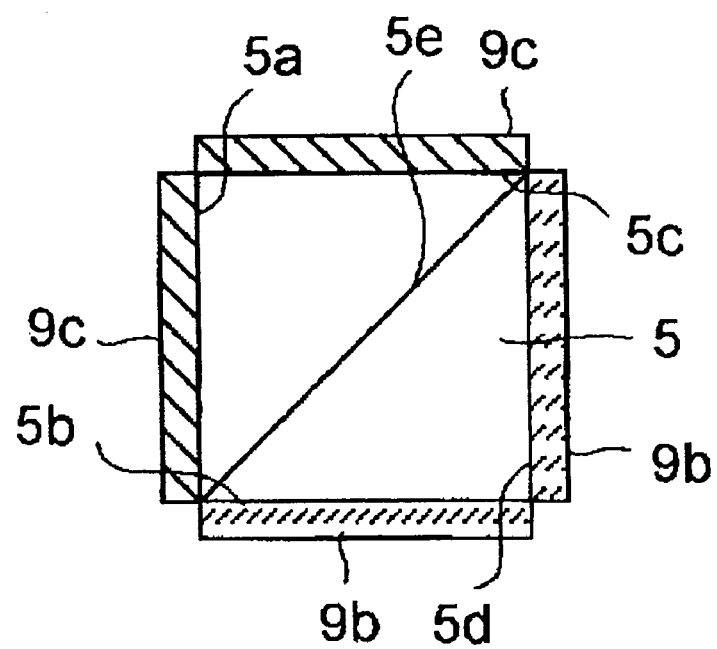
FIG. 3 is a plan view illustrating the prism of the optical pickup device according to a second embodiment of the present invention.

FIG. 3 is a plan view illustrating the prism 5 according to the second embodiment. The second surface 5b of the prism 5 is formed with the anti-reflection film 9b (second anti-reflection film) which is the same as that in the first embodiment and prevents the red light and the near infrared ray from being reflected. Further, the fourth surface 5d opposed to the first surface 5a is provided with the anti-reflection film 9b which is the same as that on the second surface 5b.

The third surface 5c of the prism 5 is provided with the anti-reflection film 9c (third anti-reflection film) which is the same as that in the first embodiment and prevents the blue light, the red light and the near infrared ray from being reflected. The first surface 5a of the prism 5 is provided with the anti-reflection film 9c which is the same as that on the third surface 5c.

As a result, the prism 5 may be reversed to be arranged, and when the optical pickup device 1 is manufactured, the prism 5 can be simply provided. A number of the steps of manufacturing the optical pickup device 1 can be, therefore, reduced.

The optical pickup device according to a third embodiment is explained below with reference to the drawing. For convenience of the explanation, the same parts as those in the first embodiment shown in FIGS. 1 and 2 are designated by the reference numerals. In the third embodiment, the constitution of the prism 5 is different from that in the first embodiment, and the other parts are the same as those in the first embodiment.

Figure 4:
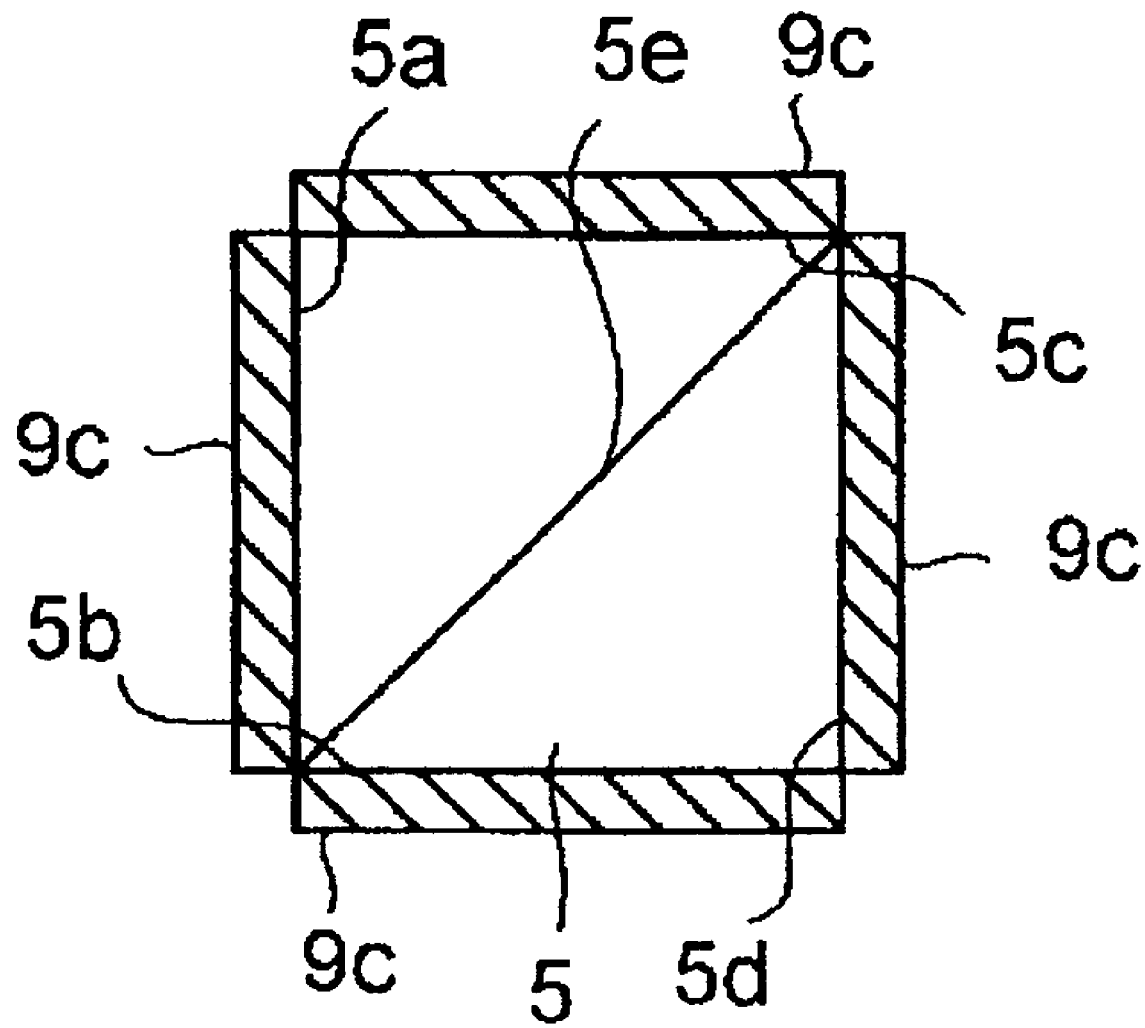
FIG. 4 is a plan view illustrating the prism of the optical pickup device according to a third embodiment of the present invention.

FIG. 4 is a plan view illustrating the prism 5 according to the third embodiment. The third surface 5c of the prism 5 is provided with the anti-reflection film 9c (third anti-reflection film) which is the same as that in the first embodiment and prevents the reflection of the blue light, the red light and the near infrared ray whose wavelengths are longer than that of the blue light. The first surface 5a, the second surface 5b and the fourth surface 5d of the prism 5 are provided with the anti-reflection film 9c which is the same as that on the third surface 5c.

As a result, the prism 5 may be reversed so as to be arranged, namely, may be rotated through 180° to be arranged. When, therefore, the optical pickup device 1 is manufactured, the prism 5 can be arranged more simply, and thus a number of the steps of manufacturing the optical pickup device 1 can be further reduced.

In the first to the third embodiments, the light source unit 2 emits the red light and the near infrared ray, but it may emit light with another wavelength longer than that of the blue light according to the optical disc D. The dichroic film 5e of the prism 5 reflects the blue light and transmits the red light and the near infrared ray, but may transmit the blue light and reflect the red light and the near infrared ray.

In the embodiments, the anti-reflection film which is compatible with a wide wavelength range from the blue light to the near infrared ray is used in the dichroic prism for synthesizing the optical paths, but it may be used in another optical member. For example, the anti-reflection film may be used in PBS prism 8, the collimating lens 4, the λ/4 plate 10, the diffraction element 7, the condensing lens 11 and the like.

The present invention can be used in the optical pickup device which reads information from Blu-ray Discs, HD DVD and the like using the blue light, from CD, CD-R, CD-RW, DVD, DVD-R, DVD-RW, DVD+R, DVD+RW, DVD-RAM and the like using the red light or the near infrared ray.

According to the present invention, the first anti-reflection film which prevents the reflection of the blue light, and the second anti-reflection film which prevents the reflection of the red light and the near infrared ray are provided to the first and the second surfaces, respectively. The third anti-reflection film, which prevents the reflection of the blue light, the red light and the near infrared ray and where the reflectance of the red light and the near infrared ray is larger than that of the blue light, is provided to the third surface. For this reason, the prism and the optical pickup device which can reduce the loss of the blue light can be obtained inexpensively.

According to the present invention, the prism is formed into the square shape viewed from plane, the first anti-reflection film is formed by the third anti-reflection film, and the fourth surface is provided with the second anti-reflection film. For this reason, the first surface and the third surface can be the incident surfaces of the blue light, and the second surface and the fourth surface can be the incident surfaces of the red light and the near infrared ray. As a result, the prism is simply installed in a device such as the optical pickup device, thereby reducing a number of the manufacturing steps.

Further, according to the present invention, since the second anti-reflection film is formed by the third anti-reflection film, the first through the fourth surfaces can be the incident surfaces of the blue light, the red light and the near infrared ray. The prism is installed more simply in a device such as the optical pickup device, thereby reducing a number of the manufacturing steps.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An optical element having a rectangular shape viewed from plane, comprising:
   a dichroic film held between transparent materials, the dichroic film transmitting one of first light included in a wavelength range of 390 to 425 nm and second light included in a wavelength range of 630 to 820 nm and reflecting the other light,
   a first surface having a first anti-reflection film for preventing reflection of the first light;
   a second surface having a second anti-reflection film for preventing reflection of the second light, perpendicular to the first surface;
   a third surface from which the incident light of the first surface and the second surface is emitted, having a third anti-reflection film for preventing the reflection of the first and the second lights; and
   a fourth surface, the first, second, third and fourth surfaces tilting with respect to the dichroic film, adjacent surfaces being perpendicular to each other,
   wherein, in the third anti-reflection film, reflectance of the second light is larger than that of the first light.

2. The optical element as claimed in claim 1, wherein the dichroic film reflects the first light and transmits the second light, and wherein the third surface is opposed to the second surface.

3. The optical element as claimed in claim 1, wherein a construction of the first anti-reflection film is replaced with that of the third anti-reflection film, and the fourth surface has the second anti-reflection film.

4. The optical element as claimed in claim 3, wherein a construction of the second anti-reflection film is film is replaced with that of the third anti-reflection film.

5. The optical element as claimed in claim 1, wherein the third anti-reflection film has a characteristic such that a reflectance of the first light is not more than 0.3%, and a reflectance of the second light is not less than 0.5% to not more than 4%.

6. An optical element for used in an optical pickup comprising a transmitting surface that transmits a first light included in a wavelength range of 390 to 425 nm and a second light included in a wavelength range of 630 to 820 nm, the transmitting surface having an anti-reflection film for preventing reflection of the first and second lights, the anti-reflection film having a characteristic such that the reflectance of the first light is not more than 0.3% and the reflectance of the second light is not less than 0.5% to not more than 4%, and wherein each of the first and second lights transmitted through the transmitting surface travels to an optical disc.

7. An optical pickup device comprising:
   a first light source emitting a first light included in a wavelength range of 390 to 425 nm;
   a second light source emitting a second light included in a wavelength range of 630 to 820 nm; and
   an optical element synthesizing an optical path of the first light and an optical path of the second light,
   the optical element including:
   a dichroic film held between transparent materials, the dichroic film transmitting one of first light and second light and reflecting the other light;
   a first, a second, a third and a fourth surfaces that tilt with respect to the dichroic film and where adjacent surfaces are perpendicular to each other;
   a first anti-reflection film for preventing reflection of the first light formed on the first surface where the first light enters;
   a second anti-reflection film for preventing reflection of the second light formed on the second surface where the second light enters, the second surface perpendicular to the first surface; and
   a third anti-reflection film for preventing the reflection of the first and the second light formed on the third surface from which the incident light of the first surface and the second surface is emitted,
   wherein the third anti-reflection film having a characteristic such that a reflectance of the first light is lower than a reflectance of the second light, and
   wherein each of the first and second lights transmitted through the third surface travels to an optical disc.

8. The optical pickup device as claimed in claim 7, wherein the dichroic film reflects the first light and transmits the second light, and wherein the third surface is opposed to the second surface.

9. The optical pickup device as claimed in claim 7, wherein a construction of the first anti-reflection film is replaced with that of the third anti-reflection film, and the fourth surface has the second anti-reflection film.

10. The optical pickup device as claimed in claim 9, wherein a construction of the second anti-reflection film is film is replaced with that of the third anti-reflection film.

11. The optical pickup device as claimed in claim 7, wherein the third anti-reflection film has a characteristic such that a reflectance of the first light is not more than 0.3%, and a reflectance of the second light is not less than 0.5% to not more than 4%.

12. An optical pickup device comprising:
    a first light source emitting a first light included in a wavelength range of 390 to 425 nm;
    a light source unit selectively emitting a second light included in a wavelength range of 630 to 690 nm and a third light included in a wavelength range of 740 to 820 nm; and
    an optical element synthesizing an optical path of the first light and optical paths of the second and third lights,
    the optical element including:
    a dichroic film held between transparent materials, the dichroic film transmitting one of first light and the light from the light source unit and reflecting the other light;
    a first, a second, a third and a fourth surfaces that tilt with respect to the dichroic film and where adjacent surfaces are perpendicular to each other;
    a first anti-reflection film for preventing reflection of the first light formed on the first surface where the first light enters;
    a second anti-reflection film for preventing reflection of the second and third lights formed on the second surface where the second and third lights enter, the second surface being perpendicular to the first surface; and
    a third anti-reflection film for preventing the reflection of the first, second and third lights formed on the third surface from which the incident light of the first surface and the second surface is emitted, wherein the third anti-reflection film having a characteristic such that a reflectance of the first light is lower than a reflectance of the second and third lights, and wherein each of the first, second and third lights transmitted through the third surface travels to an optical disc.

13. The optical pickup device as claimed in claim 12, wherein the dichroic film reflects the first light and transmits the second and third lights, and wherein the third surface is opposed to the second surface.

14. The optical pickup device as claimed in claim 12, wherein a construction of the first anti-reflection film is replaced with that of the third anti-reflection film, and the fourth surface has the second anti-reflection film.

15. The optical pickup device as claimed in claim 14, wherein a construction of the second anti-reflection film is replaced with that of the third anti-reflection film.

16. The optical pickup device as claimed in claim 12, wherein the third anti-reflection film has a characteristic such that a reflectance of the first light is not more than 0.3%, and a reflectance of the second and third lights is not less than 0.5% to not more than 4%.

* * * * *

UNITED STATES PATENT AND TRADEMARK OFFICE
CERTIFICATE OF CORRECTION

| | | |
|---|---|---|
| PATENT NO. | : 7,372,798 B2 | Page 1 of 1 |
| APPLICATION NO. | : 11/099048 | |
| DATED | : May 13, 2008 | |
| INVENTOR(S) | : Tomokazu Taguchi et al. | |

It is certified that error appears in the above-identified patent and that said Letters Patent is hereby corrected as shown below:

In the Claims

Column 9, in claim 4, line 38, after "anti-reflection" delete "film is" (second occurrence).

Column 9, in claim 6, line 45, after "element for" delete "used" and substitute --use-- in its place.

Column 10, in claim 10, line 31, before "replaced with" delete "film is".

Signed and Sealed this

Seventh Day of October, 2008

JON W. DUDAS
*Director of the United States Patent and Trademark Office*